(12) United States Patent
Walz

(10) Patent No.: US 7,799,110 B2
(45) Date of Patent: *Sep. 21, 2010

(54) FILTER APPARATUS ESPECIALLY FOR FILTRATION OF COMBUSTION AIR IN INTERNAL COMBUSTION ENGINES

(75) Inventor: Stefan Walz, Ludwigsburg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 347 days.

This patent is subject to a terminal disclaimer.

(21) Appl. No.: 11/862,673

(22) Filed: Sep. 27, 2007

(65) Prior Publication Data
US 2008/0072554 A1 Mar. 27, 2008

(30) Foreign Application Priority Data
Sep. 27, 2006 (DE) .................. 10 2006 045 985

(51) Int. Cl.
B01D 46/00 (2006.01)
B01D 39/00 (2006.01)
B01D 24/00 (2006.01)
B01D 39/14 (2006.01)
B01D 50/00 (2006.01)
F01N 3/10 (2006.01)
F01N 3/08 (2006.01)

(52) U.S. Cl. ............... 55/498; 55/522; 55/523; 55/524; 422/172; 422/173; 422/174; 422/175; 422/176; 422/177; 422/178; 422/179; 422/180

(58) Field of Classification Search ............... 55/498, 55/522–524; 422/172–180
See application file for complete search history.

(56) References Cited

U.S. PATENT DOCUMENTS

| 2,185,584 | A | * | 1/1940 | Boyce | 55/517 |
| 3,181,302 | A | * | 5/1965 | Lindsay | 405/156 |
| 3,451,197 | A | * | 6/1969 | Ballard | 55/341.1 |
| 3,690,045 | A | * | 9/1972 | Neumann et al. | 55/356 |
| 4,118,940 | A | * | 10/1978 | Beane | 405/174 |

(Continued)

FOREIGN PATENT DOCUMENTS

DE         704 629        4/1941

(Continued)

OTHER PUBLICATIONS

European Search Report including English translation of relevant portion dated Jul. 11, 2008 (Seven (7) pages).

*Primary Examiner*—Walter D Griffin
*Assistant Examiner*—Amber Orlando

(57) ABSTRACT

A filter apparatus having an element configured as a tubular filter, which is mounted in a carrier tube such that an annular space for fluid flow is formed between the outer surface of the tubular filter element and the inner surface of the carrier tube. The tubular filter is releasably mounted inside the carrier tube such that it can be pulled by one end out of the carrier tube and a second tubular filter element connected to the opposite end of the filter element being pulled out can simultaneously be pulled into the carrier tube.

8 Claims, 2 Drawing Sheets

U.S. PATENT DOCUMENTS

| | | | | |
|---|---|---|---|---|
| 4,412,918 A | * | 11/1983 | Rickett | 210/167.11 |
| 4,666,228 A | * | 5/1987 | Wood | 439/277 |
| 5,078,864 A | * | 1/1992 | Whittier | 210/137 |
| 5,269,824 A | * | 12/1993 | Takita | 55/493 |
| 5,431,706 A | * | 7/1995 | Paas | 55/342 |
| 5,766,289 A | * | 6/1998 | Haggard | 55/498 |
| 5,809,776 A | * | 9/1998 | Holtermann et al. | 60/288 |
| 6,641,637 B2 | * | 11/2003 | Kallsen et al. | 55/385.3 |
| 6,911,144 B2 | * | 6/2005 | Van Pelt et al. | 210/232 |
| 7,070,638 B2 | * | 7/2006 | Jeanfreau | 55/385.1 |
| 7,320,723 B2 | * | 1/2008 | Sewell, Sr. | 55/512 |
| 7,329,310 B2 | * | 2/2008 | Olapinski et al. | 95/273 |
| 2005/0042036 A1 | * | 2/2005 | Carter et al. | 405/184.3 |
| 2005/0211095 A1 | * | 9/2005 | Zambrano et al. | 95/273 |
| 2006/0207948 A1 | * | 9/2006 | Hacker et al. | 210/791 |
| 2007/0131194 A1 | | 6/2007 | Moser et al. | |
| 2007/0213685 A1 | * | 9/2007 | Bressler et al. | 604/500 |

FOREIGN PATENT DOCUMENTS

| | | |
|---|---|---|
| WO | WO 2005/095783 | 10/2005 |
| WO | WO 2005/096423 A2 | 10/2005 |
| WO | WO 2007/062715 A1 | 6/2007 |
| WO | WO 2007/096280 A1 | 8/2007 |

* cited by examiner

FILTER APPARATUS ESPECIALLY FOR FILTRATION OF COMBUSTION AIR IN INTERNAL COMBUSTION ENGINES

BACKGROUND OF THE INVENTION

The present invention relates to a filter apparatus, and especially to a filter apparatus for filtering combustion air in internal combustion engines.

U.S. Patent Publication No. 2007/0131194 (=WO 2005/095783) describes a filter apparatus for filtering combustion air for an internal combustion engine. The filter element of this filter apparatus comprises a plurality of tubular filters that are covered by a housing cover. The filter walls of the tubular filters are formed of a porous filter material. On the outside of the tubular filters, the ambient air guided into the engine compartment flows in radially, such that dirt particles entrained in the air are deposited on the outside of the tubular filters. The filtered air in the tubular filters is discharged axially and fed into a plenum chamber, which communicates with the cylinder intake ports of the internal combustion engine. Since a plurality of tubular filters is provided, the filter surface is sufficiently large to keep the pressure drop between the unfiltered and the filtered side low.

Filter elements of this kind must be serviced at regular intervals because the filtration efficiency decreases as dirt accumulates along the filter wall on the unfiltered side or the pressure drop between the unfiltered and the filtered side continues to increase.

SUMMARY OF THE INVENTION

It is therefore an object of the invention to provide an improved filter apparatus suitable, for example, for filtering air in an internal combustion engine.

Another object of the invention is to provide a filter apparatus which can be constructed using simple structural elements but which simultaneously permits extensive design freedom with respect to the filter geometry.

A further object of the invention is to provide a filter apparatus which allows easy replacement of the filter element.

These and other objects are achieved in accordance with the present invention by providing a filter apparatus comprising a filter element configured as a tubular filter, said filter element having a filter wall which radially separates an unfiltered fluid side of the filter from a filtered fluid side of the filter; said tubular filter being releasably mounted in a carrier tube such that an annular space for fluid flow is formed between an outer surface of the tubular filter and an inner surface of the carrier tube.

The filter apparatus according to the invention has a filter element embodied as a tubular filter whose filter wall radially separates the unfiltered side from the filtered side. For filtering, the fluid passes radially through the filter wall. The fluid may in principle pass radially from the outside toward the inside or in the opposite direction, i.e., radially from the inside toward the outside.

The tubular filter is held in a carrier tube, such that an annular space is formed for the flow of the fluid between the outer surface of the tubular filter and the inner surface of the carrier tube. The carrier tube is part of the filter housing or forms the filter housing. Because the filter element is designed as a tubular filter, it can be flexibly held in carrier tubes of various geometries. The tubular filter is advantageously made of a soft, pliable nonwoven filter material and is highly flexible so that it can bend particularly in transverse direction. On the other hand, the filter material per se may be rigid and the element pleated to provide the flexibility. Because of this flexibility, the same kind of tubular filters may be used for different carrier tube geometries. The preferred material for the tubular filter is a polymer-based synthetic, but cellulose-based materials may of course also be considered.

The annular space between the outer surface of the tubular filter and the inner surface of the carrier tube allows the fluid to flow in the axial direction of the carrier tube. This annular space can represent either the unfiltered side or the filtered side of the filter apparatus. If it is the unfiltered side, the combustion air is guided into this annular space and from there flows radially through the filter wall from the outside to the inside, so that the dirt particles are deposited on the outside of the tubular filter. Since axial discharge at the opposite end face of the unfiltered side is not possible because this end face is closed, the combustion air is forced to take the radial path through the wall of the tubular filter.

The same applies if the annular wall is configured to be the filtered side and the combustion air is supplied via the interior of the tubular filter. In this case, the interior of the tubular filter represents the unfiltered side, and the unfiltered fluid flows radially from the inside toward the outside into the surrounding annular space that represents the filtered side. The filtered fluid can then flow axially out of the annular space.

The tubular filter in the filter apparatus according to the invention is moreover releasably held in the carrier tube. This feature is a prerequisite for the replaceability of the tubular filter, and there is no need to also remove the carrier tube from its installation position. Rather, it is sufficient to pull the tubular filter out of the carrier tube while the carrier tube remains in position. In a preferred embodiment this is accomplished by connecting one end of the tubular filter to be replaced while it is mounted in the carrier tube to a second tubular filter and then pulling the tubular filter to be replaced out of the carrier tube at the other, opposite end of the tube. Because of the connection between the two tubular filters, the new clean tubular replacement filter is automatically pulled into the carrier tube as the first, dirty tubular filter is pulled out. Once the first tubular filter has been pulled out completely, the second tubular filter is seated inside the carrier tube, so that the connection between the two tubes can be released.

The two tubes are preferably connected by a connecting element that can be attached to the ends of the two tubes. This connecting element must be capable of being guided through the carrier tube, i.e., its cross-sectional geometry may not be larger than the inside diameter of the carrier tube, or it must be compressible or flexible to a minimum degree.

According to another advantageous embodiment, the connecting element may simultaneously serve as a retaining component to fix the tubular filter that is currently located in the carrier tube, so that the tubular filter is retained axially and optionally also radially inside the carrier tube. In the latter case, the connecting or retaining component also acts as a spacer to fix the radial distance between the tubular filter and the inner surface of the carrier tube.

Regardless of the connecting element used, it may be advantageous to provide spacer elements to hold the tubular filter inside the carrier tube spaced a distance from the inside surface of the carrier tube. However, these spacers must allow the tubular filter to slide within the carrier tube to ensure that the tubular filter can be replaced during servicing.

According to an advantageous further development, the spacers are formed by folds in the tubular filter whose outer tips contact the inner surface of the carrier tube and thereby radially stabilize the tubular filter inside the carrier tube. At the same time this still leaves a sufficiently large annular space between the carrier tube and the tubular filter to enable the fluid to flow within the annular space because only the tips of the folds contact the inner surface of the carrier tube.

According to yet another advantageous embodiment, these folds have edges which form an angle with the longitudinal filter axis, i.e., they have a component in circumferential direction. On the one hand, folds with this orientation give the tubular filter great stability without limiting its flexibility. On the other hand, the filter surface is increased for a similar length of the tubular filter. Axially, the tubular filter can be extended or compressed and will return to its original shape or length as soon as the external forces are removed. This tubular filter can also be deformed readily in the transverse direction.

In principle, however, it is also possible to construct the tubular filter with a smooth, fold-free wall. In this embodiment, the tubular filter, which is made of a soft and pliable filter material, also has a high degree of flexibility in the transverse direction.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
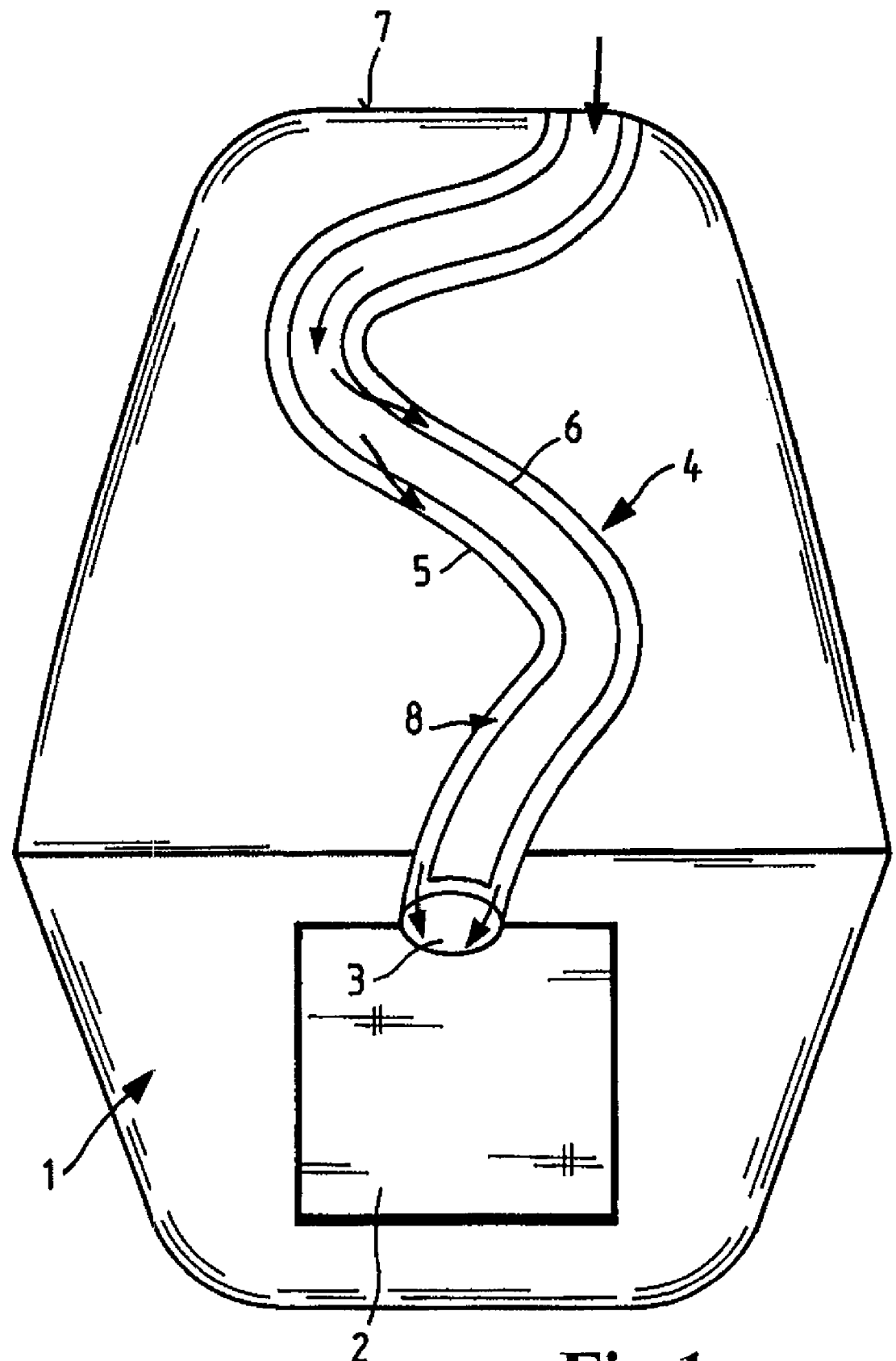
FIG. 1 is a schematic representation of the engine compartment of a motor vehicle with open hood showing the filter apparatus for filtering the combustion air arranged therein, the filter apparatus being configured as a carrier tube holding the tubular filter.

FIG. 1 shows the engine compartment 1 of a motor vehicle and the combustion engine 2 arranged therein. Filtered combustion air is supplied to the combustion engine 2 through an opening 3. The combustion air is filtered in a filter apparatus 4 located upstream of the opening 3. The filter apparatus 4 comprises a carrier tube 5 which acts as a filter housing and a tubular filter 6 arranged inside the carrier tube and extending over the axial length of the carrier tube 5. Both the carrier tube 5 and the tubular filter 6 preferably have a round cross section, the shape of which can range from elliptical to circular. The outside diameter of the tubular filter 6 is smaller than the inside diameter of the carrier tube 5, so that an annular space 8 is formed between the outer surface of the tubular filter 6 and the inner surface of the carrier tube 5, which extends between the axial end faces of the filter apparatus and forms a flow space for the fluid, i.e., the combustion air.

The carrier tube 5 with the tubular filter 6 extends between the vehicle front 7 of the motor vehicle and the opening 3 to the intake ports of the internal combustion engine 2. Combustion air flowing against the vehicle front 7 is advantageously guided into the interior of the tubular filter 6, which is open on that side. The opposite axial end face of the tubular filter, which is adjacent to the opening 3, is closed, however, so that the introduced and as yet unfiltered combustion air is forced to take the radial path through the wall of the tubular filter 6 from the inside toward the outside, so that filtering takes place on the inside of the filter wall. The filtered combustion air is then axially supplied to the internal combustion engine 2 through the annular space 8. On its side facing the internal combustion engine 2 the carrier tube 5 is open, whereas on the side facing the vehicle front 7 it is closed.

There are many different options with respect to the geometric shape of the carrier tube 5, and the embodiment shown in FIG. 1 is only one example, which can in principle be modified as desired. The great flexibility of the tubular filter 6 in the carrier tube 5 makes it possible to use tubular filters as identical parts for many different carrier tube geometries.

Figure 2:
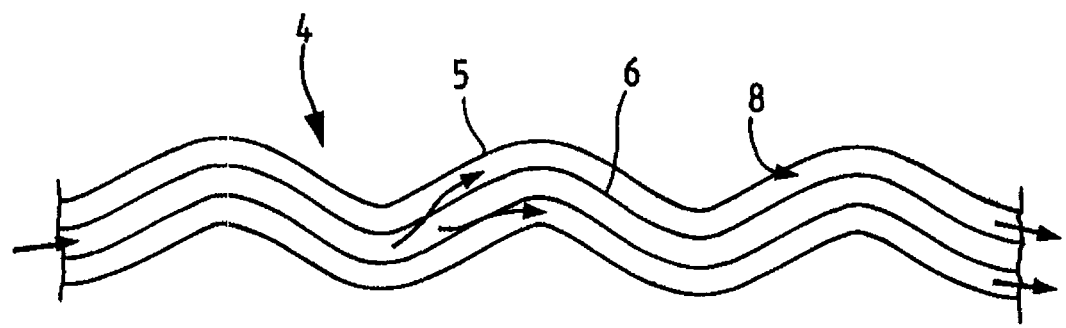
FIG. 2 is a schematic representation of the filter apparatus with carrier tube and tubular filter.

FIG. 2 shows the filter apparatus 4 in a detail view. The annular space 8 between the outer surface of the tubular filter 6 and the inner surface of the carrier tube 5 acts as the filtered side, through which the filtered combustion air is axially discharged after having passed through the filter wall of the tube 6. The flow conditions may however also be reversed, such that the annular space 8 acts as the unfiltered side via which the unfiltered combustion air is supplied. In this case, the combustion air passes radially from the annular space 8 through the wall of the tubular filter 6 from the outside toward the inside and is discharged axially through the interior of the tubular filter, which in this case is the filtered space. In both variants, the unfiltered combustion air is first introduced axially into the filter apparatus 4 and must then flow radially through the filter wall of the tubular filter 6.

Figure 3:
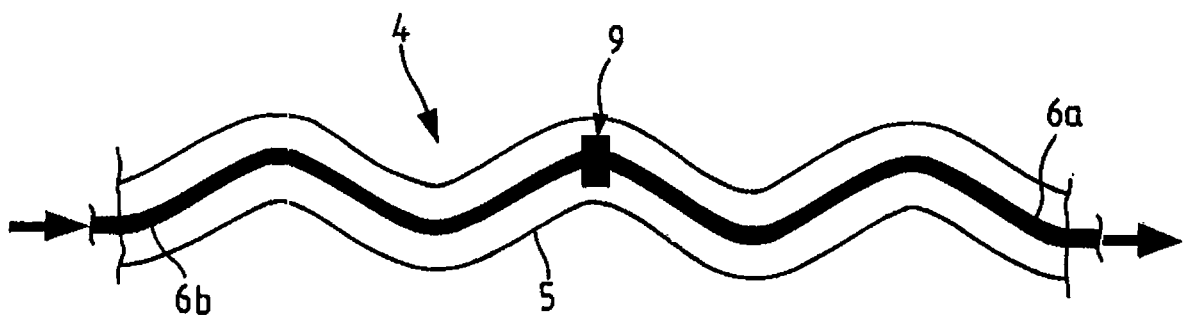
FIG. 3 is another schematic representation of the filter apparatus showing the tubular filter in the process of being replaced, with its tube end connected to a second tubular replacement filter by a connecting element.

FIG. 3 shows a filter apparatus 4 whose dirty tubular filter 6a is being replaced by a clean and unused tubular replacement filter 6b. To enable the tubular filter to be replaced without removing the carrier tube 5 from its installation position, a method is used where the one tube end of the old, dirty tubular filter 6a is attached to the tube end of the new, clean tubular filter 6b by a connecting element 9. The old tubular filter is then pulled out of the carrier tube 5 by its tube end remote from the connecting element 9. Because of the connection to the new tubular filter 6b by the connecting element 9, the new tubular filter 6b is simultaneously pulled into the carrier tube 5. Once the old tubular filter 6a has been completely removed from the carrier tube 5, the new tubular filter 6b is automatically seated in its correct position within the carrier tube 5. The old tubular filter 6a can then be detached from the connecting element 9. The connecting element 9 can either also be detached from the new tubular filter 6b and removed from the filter apparatus 4 or, in an alternative embodiment, can remain in place within the carrier tube to fix the new tubular filter 6b in relation to the carrier tube 5. In this function, the connecting element represents a retaining component, and the radial distance of the tubular filter in relation to the inner wall of the carrier tube 5 is defined as well.

The filter apparatus is particularly suitable for filtering combustion air in internal combustion engines. However, it can also be used to filter the air of the vehicle interior or for filtration in vehicles in general.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claim and equivalents thereof.

What is claimed is:

1. A filter apparatus comprising a filter element configured as a tubular filter, said filter element having a filter wall which radially separates an unfiltered fluid side of the filter from a filtered fluid side of the filter;

said tubular filter being releasably mounted in a carrier tube such that an annular space for fluid flow is formed between an outer surface of the tubular filter and an inner surface of the carrier tube;

wherein a first one of said tubular filter installed in said carrier tube is releasably connectable to a second one of said tubular filter, said releasable connection engageable to enable installation of said second tubular filter into a first end of said carrier tube by pulling said first tubular filter our of an opposing end of said carrier tube;

wherein after said second tubular filter is installed to replace said first tubular filter, said connection between said first and second filter tubes is released to disengage said first tubular filter, thereby separating from said carrier tube.

2. A filter apparatus according to claim 1, wherein the tubular filter is held within the carrier tube spaced a distance from the inner surface of the carrier tube by spacers, and wherein the spacers allow the tubular filter to slide axially within the carrier tube.

3. A filter apparatus according to claim 1, further comprising a connecting element which is attachable to one tubular end of the tubular filter and which simultaneously can be attached to a tubular end of a second tubular filter such that the connecting element can be passed through the carrier tube.

4. A filter apparatus according to claim 1, wherein the tubular filter is a soft pliable filter formed without pleats or folds.

5. A filter apparatus according to claim 1, wherein folds are formed in the filter wall of the tubular filter.

6. A filter apparatus according to claim 5, wherein the folds in the filter wall have fold edges that form an angle with the longitudinal axis of the filter tube.

7. A filter apparatus according to claim 5, wherein the folds form the spacers, and the radially outer tips of the folds contact the inner surface of the carrier tube.

8. A method of replacing a tubular filter element in a filter apparatus comprising a filter element configured as a tubular filter having a filter wall which radially separates an unfiltered fluid side of the filter from a filtered fluid side of the filter;

said tubular filter element being releasably mounted in a carrier tube such that an annular space for fluid flow is formed between an outer surface of the tubular filter element and an inner surface of the carrier tube; said method comprising connecting one tube end of the tubular filter element, which is located within the carrier tube and which is to be replaced, to an end of a second tubular filter element, and pulling the tubular filter element which is to be replaced by its opposite end out of the carrier tube, whereby the second tubular filter element is pulled into the carrier tube.

* * * * *